United States Patent
Kapoor

(10) Patent No.: US 11,429,886 B2
(45) Date of Patent: Aug. 30, 2022

(54) AUTOMATED MEASUREMENT OF CONTENT QUALITY AND PUBLISHER QUALITY

(71) Applicant: Microsoft Technology Licensing, LLC, Redmond, WA (US)

(72) Inventor: Divye Kapoor, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1100 days.

(21) Appl. No.: 16/019,796

(22) Filed: Jun. 27, 2018

(65) Prior Publication Data

US 2020/0005177 A1    Jan. 2, 2020

(51) Int. Cl.
*G06N 7/08* (2006.01)
*G06Q 50/00* (2012.01)
*G06F 16/901* (2019.01)

(52) U.S. Cl.
CPC ........... *G06N 7/08* (2013.01); *G06F 16/9024* (2019.01); *G06Q 50/01* (2013.01)

(58) Field of Classification Search
CPC ...... G06N 7/08; G06N 7/005; G06F 16/9024; G06Q 50/01
See application file for complete search history.

(56) References Cited

U.S. PATENT DOCUMENTS

| 10,771,424 | B2* | 9/2020 | Kapoor | G06F 16/3346 |
| 10,839,304 | B2* | 11/2020 | Corbin | G06F 16/9024 |
| 10,936,963 | B2* | 3/2021 | Traupman | G06N 5/02 |
| 10,938,592 | B2* | 3/2021 | Carroll | H04L 67/306 |
| 2016/0132781 | A1* | 5/2016 | Traupman | H04L 51/00 |
| | | | | 706/52 |

* cited by examiner

*Primary Examiner* — Robert G Bachner
(74) *Attorney, Agent, or Firm* — Schwegman Lundberg & Woessner, P.A.

(57) ABSTRACT

An online system receives member-created content. The system identifies member interactions with the member-created content. The system then calculates a creator scores for members, and content scores for content. The system identifies members of the online system as creators when the creator scores transgress a threshold, and the system provides to members of the online system follow recommendations for member based on the creator scores for the members.

20 Claims, 8 Drawing Sheets

AUTOMATED MEASUREMENT OF CONTENT QUALITY AND PUBLISHER QUALITY

TECHNICAL FIELD

The present disclosure generally relates to the technical field of online systems, and in an embodiment, but not by way of limitation, to an online system that is capable of identifying members who are creators of high quality content on the online system.

BACKGROUND

Online systems provide members with the ability to connect and communicate with other members, and to generate and post content on the online system. The posting of valuable content by a member improves the robustness of the online system. By the same token however, the posting of low quality content denigrates the overall quality of the online system.

There is consequently a need for online systems to identify influential members who drive conversations through their distribution of high quality content on the online system. These members inject an engaging, valuable, professionally-oriented experience on the online system and are liked by other such influencers. It would be beneficial if the online system could identify such members from others who generate low quality or spam-like content on the system.

DESCRIPTION OF THE DRAWINGS

Some embodiments are illustrated by way of example and not limitation in the accompanying drawings, in which.

DETAILED DESCRIPTION

Figure 1:
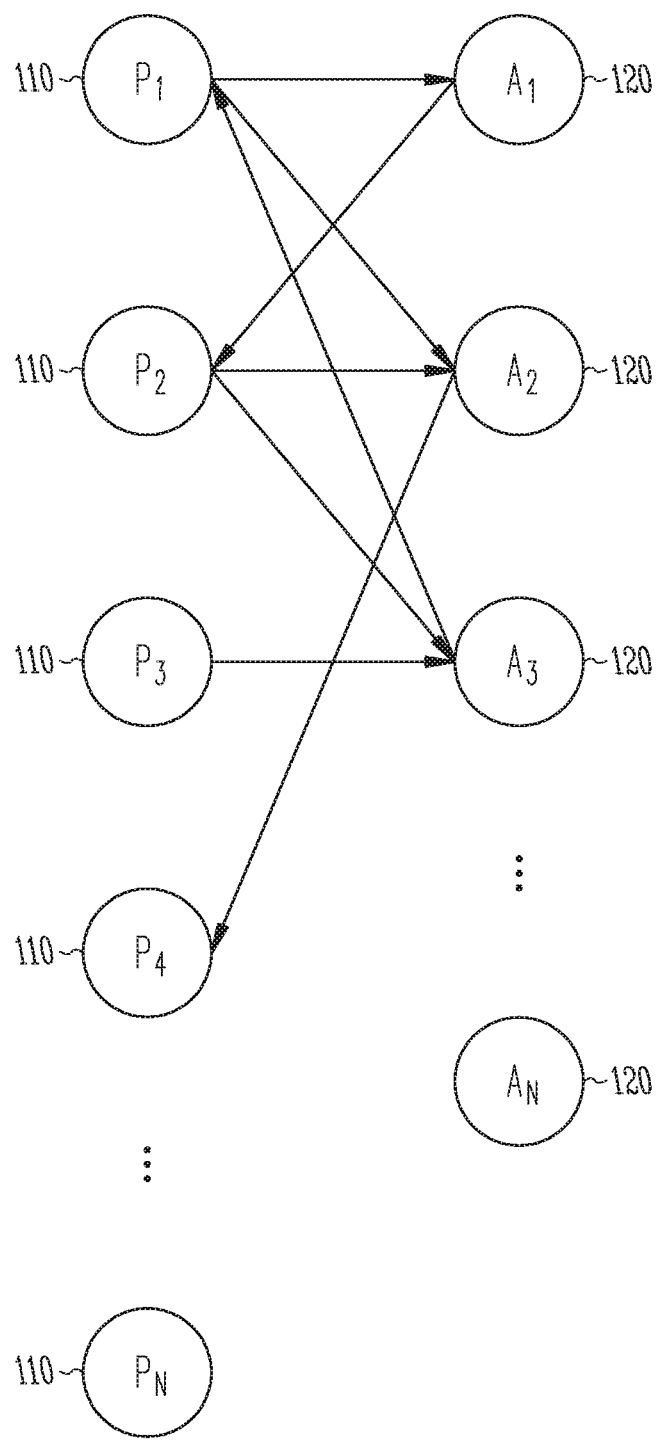
FIG. 1 is a diagram illustrating the relationship among members, activities, and the social interactions among them (e.g., likes, comments, clicks, views, dwell times, reactions, congratulations, thanks, and sharings) on an online system.
Figure 2A:
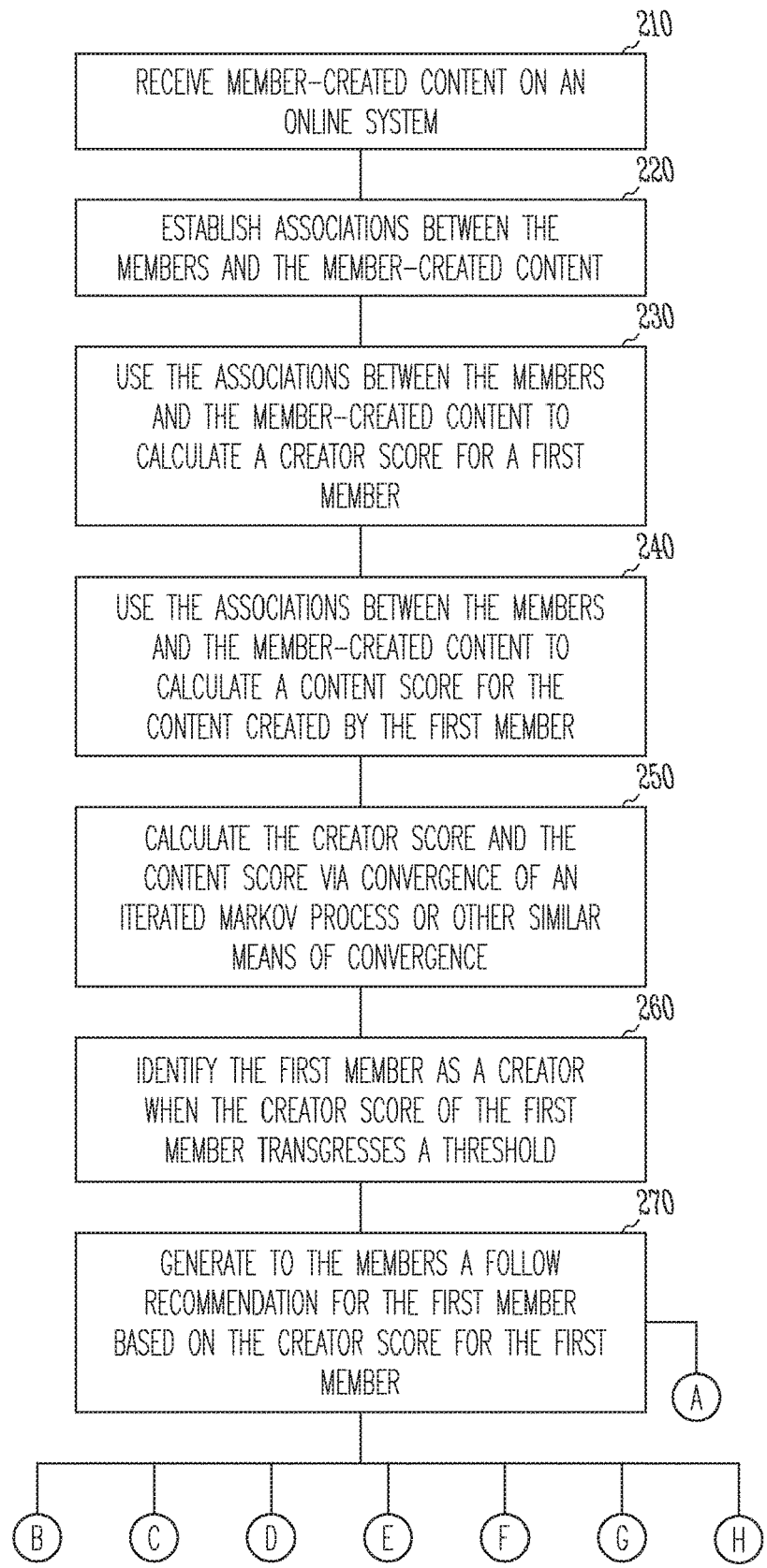
FIGS. 2A, 2B, 2C, and 2D are block diagrams illustrating operations and features of an online system that is capable of identifying creators of quality content on the online system.
Figure 2B:
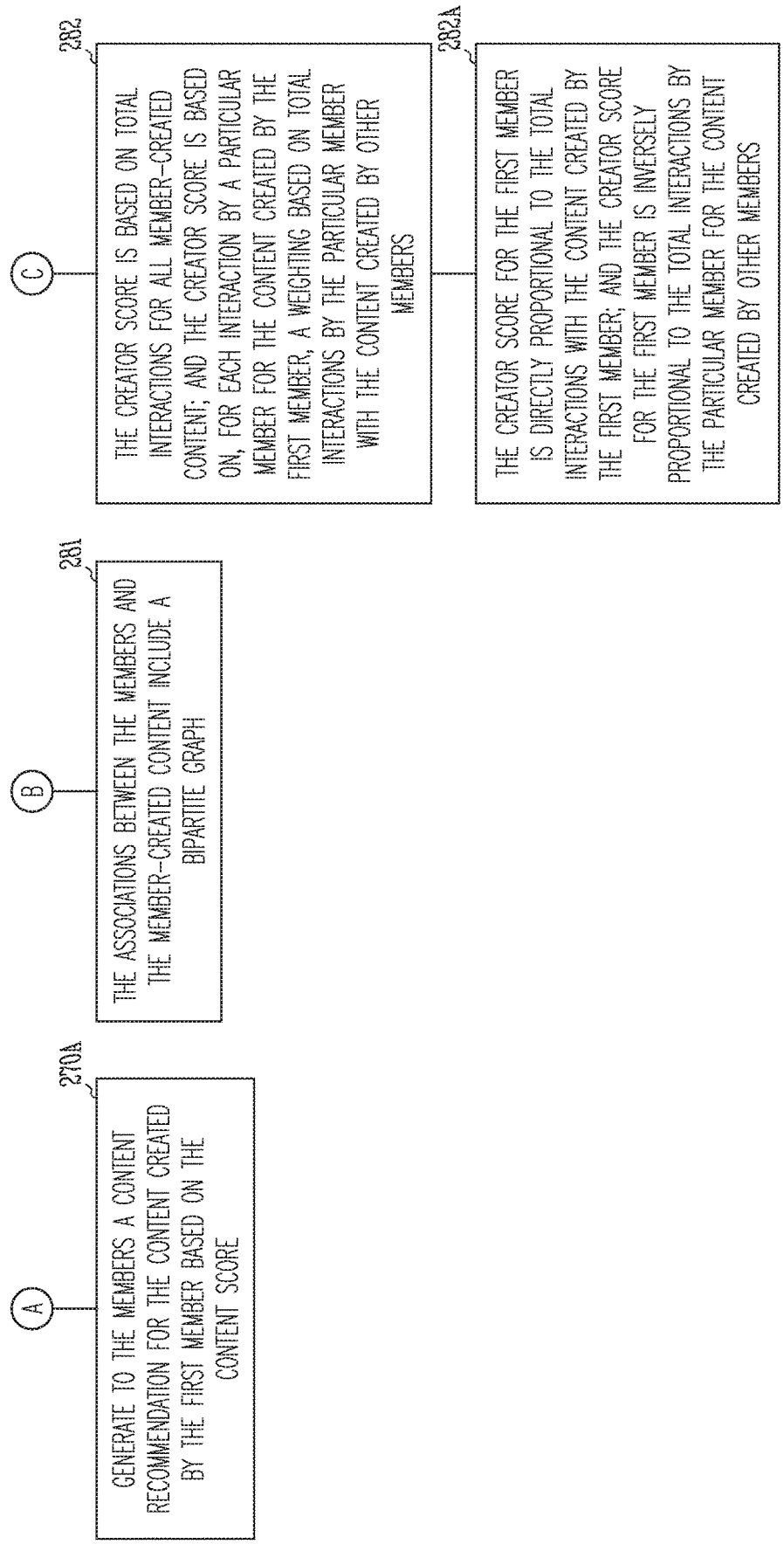
Figure 2C:
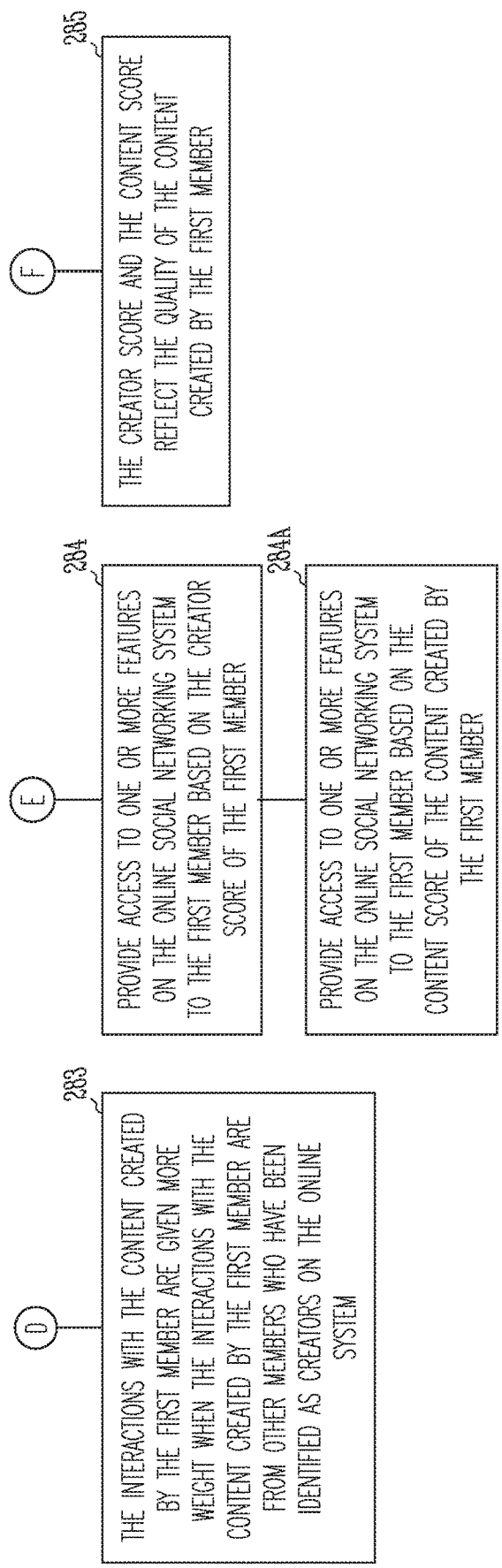
Figure 2D:
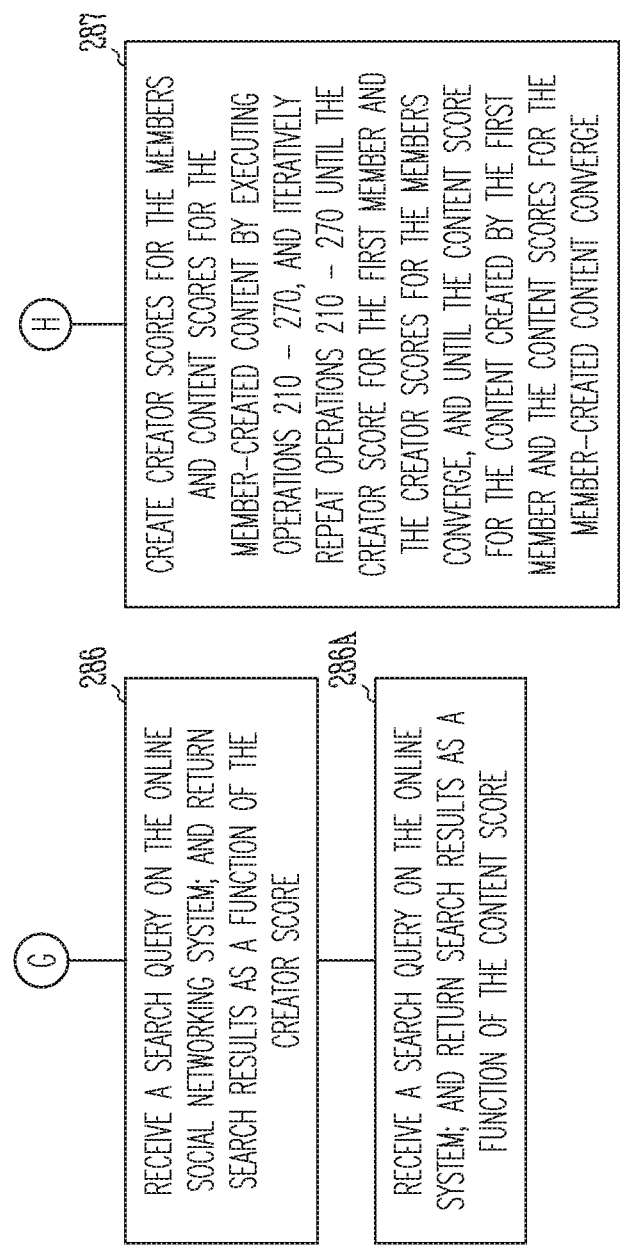

In the following description, for purposes of explanation, numerous specific details are set forth in order to provide a thorough understanding of the various aspects of different embodiments of the present invention. It will be evident, however, to one skilled in the art that the present invention may be practiced without all the specific details and/or with variations, permutations, and combinations of the various features and elements described herein.

In general, good or high-quality content on an online system includes professionally-focused, relevant, and topical content that is engaging and is interacted with (for example, liked by and/or commented on) by high-quality members of the online system. In contrast, poor or low-quality content is content that is not focused, not entirely relevant, and not very topical. Low-quality content can include content such as general spam, comment spam, recruiter spam (for example, "Please like this post to apply for this job" or "Please comment on this post to support this cause"), puzzles, and open invite posts.

In an embodiment, to generate creator scores for members of an online system and content scores for content posted by members, data from past activity posts (e.g., articles by a member) are analyzed. The data can be from the past two years or so, and to be considered, the posted activity should have received some interaction from members, such as at least one like and one comment. The generated creator score and content score indicate the quality of the content created by this member.

Specifically, one or more embodiments as described herein generate a set of creator scores that separate influential creators from consumers on the online system. These creator scores rank members (and/or companies) on a single scale. That is, a creator score is reported as a probability from 0.0 to 1.0 (wherein all creator scores sum up to 1), and a creator score closer to 1.0 identifies a member who creates high-quality content. The creator scores tend to discount members that perform like or comment hacking, recruiter spam, or other growth hacks, and tend to boost those members that regularly generate large distributions through high-quality, connected, and engaged networks. As a corollary, the online system can also rank content in the order of what such creators find engaging. The creator scores and content scores are determined irrespective of whether members are connected to each other. In short, the online system models an activity's goodness based in part on the goodness of the people that interact with it.

At the highest level, an online system can identify members who generate high quality content as follows. Member interaction with the online system can be divided up into a set of sessions. Each session corresponds to a member visit wherein the member chooses to interact with a subset of activities offered to the member. In this method, a prior distribution of members' influence (a precursor to the creator score) is assumed to be present over the member space in equal amounts to all members. This influence is measured by an initial magnitude. During each session, a member's influence is distributed among the activities with which the member interacts. As the system runs through the list of sessions, a derived distribution of influence received by each activity is built up. If the priors on a member's influence are good, there will be activities where many small-influence members can contribute to an activity's importance or large brands with large influence can contribute to an activity's importance. This process is similar to looking at each activity and taking a weighted sum of influence from likers, commenters, and sharers of the activity, where the weights are proportional to the judged quality of the member and the quality of the social action. In an embodiment, it is beneficial to select appropriate hyperparameters for likes versus shares versus comments versus views, and the quality of the prior influence. For example, a hyperparameter may weight comments twice as much as likes.

The creator scores are heavily influenced by the feed model used to show activities to a member and these indirectly depend on a member's social network size, connections, and distribution, and because of mutual dependence, cannot be used for feed model improvement. However, the creator scores at convergence are independent of the chosen prior and a uniform prior is equally effective.

In an example, a system can consider activities over a historical time period, for example the last two years, and use this to generate an initial creator score. At the start of the process, all members are provided a certain magnitude of influence (or an initial creator score). In an embodiment, all members are assigned an equal magnitude of influence. Then, in a certain initial time period, the system determines the interactions with the member-created content (such as likes, comments, clicks, views, dwell times, reactions, congratulations, thanks, and sharings), along with the weighting of those interactions. The magnitude of influence assigned to every member is distributed and is collected by the content creator after a first round. Then, in succeeding rounds, the influence is redistributed based again on the interactions with the member-created content. Eventually the process stabilizes and the retained influence associated with each member will converge. Thereafter, in the future, the influences can be updated as new data are captured. After convergence, the creator score, which is actually a probability, is approximated by the influence associated with a member divided by the total influence in the system. Similarly, the content score, which is also a probability, is approximated by a magnitude of goodness or quality associated with the content divided by the total content quality in the system.

One issue with using this model of influence is that the model is not tuned for influence in other contexts. Members may be considered influential because of who they are (e.g., high profile views, positions such as executive roles, etc.) (e.g., Barack Obama, Dalai Lama), not because of what these members produce as content on the feed of the online system. Indeed, influential people may receive low creator scores even if they are likely to produce good content, because the creator scores are based on member-interaction with the content, not on who the creator of the content is.

The online system can model a good activity as one that is considered good by the best creators on the online system. Here, a best creator is defined by the engagement that is generated by the content created by the creator. That is, if a member produces engaging content regularly, that member should have a higher weight in determining what good content is on the feed as compared to a person whose authored content is not as engaging.

For example, in one scenario a member can be a company that regularly posts brand articles that are engaging and useful, and that are liked by creators and consumers alike. Considering only creators that interact with the content as providing a useful signal, and then weighting each of those creators by the quality of the content they produce, the system can determine an influence probability of the company page. In another scenario, the member is a recruiter that regularly posts jobs. This member's audience is largely consumers who do not create engaging content. Unless it's a job post from an influential creator, it is less likely that the distribution of likers, commenters, and/or sharers that are interacting with the post is going to be of high quality and the influence score is likely to be low.

Referring to FIG. 1, the system in an embodiment can be modeled as a bipartite graph representing a Mutually Dependent Markov process with two sets of agents and two transition functions as follows:

Members/People: $P=\{P1, P2, \ldots, PN\}$
Activities: $A=\{A1, A2, \ldots, AM\}$
Transition Function 1 (TF1; Interactions): $P \times A \rightarrow \mathbb{R}$ (real numbers)
(e.g., P1 liked A2, TF1→(P1, A2)=1)
Transition Function 2 (TF2; Authorship): $A \times P \rightarrow \mathbb{R}$ or just simply $A \rightarrow P$)
(e.g., A3 created by P1, TF2(A3, P1)=1 or TF2(A3)=P1)
State: V: $P \rightarrow \mathbb{R}$ (such that Sum(V(P))=1) represents the personal influence probability
State: U: $A \rightarrow \mathbb{R}$ (such that Sum(U(A))=1) represents the activity influence probability The bipartite graph of FIG. 1 represents people or members 110 and activities 120. The edges traversing from one or more members 110 to one or more activities 120 indicate that a particular member likes, commented on, clicked on, or interacted some other way with one or more activities 120 on the online system (TF1). The edges from an activity 120 to a member 110 indicate that the member is the author of that activity (TF2). As can be seen from FIG. 1, a member 110 can like, comment on, or click on more than one activity, but an activity only has one author. Also, State V is initialized by the influence prior (e.g., uniform distribution).

As the system iterates through the Markov Process, the state mappings V and U will converge to stationary distributions over P and A respectively that represent the members' influence. This convergence process is guided by the interaction weights in Transition Function 1 (TF1) and Transition Function 2 (TF2). The system may recommend to members activities by personalizing and selecting from the top few influential activities. New activities can also be associated with a rough goodness prior based on the personal influence of the author.

FIGS. 2A, 2B, 2C, and 2D are a block diagram illustrating operations and features of an example system and method for identifying creators of high-quality content on an online system. In various embodiments, the system and method may be implemented by one or more of the modules or processors of FIG. 3 and/or FIG. 4. FIGS. 2A, 2B, 2C, and 2D include a number of process blocks 210-287. Though arranged substantially serially in the example of FIGS. 2A, 2B, 2C, and 2D, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 2A, 2B, 2C, and 2D, an embodiment of a process to identify creators of high quality content on an online system is described. Specifically, at 210, member-created content is received into on an online system from members of the online system. This member-created content can include virtually any type of information or data, and can be literary, graphic, visual, or some other form of information. Additionally, the information may actually be created by the member such that the member is the author in a copyright sense, or the member simply may have posted the authorial work of some other third person (either a member or a non-member).

At 220, the online system establishes associations between the members and the member-created content. As further indicated at 281, in an embodiment, these associations include the use of a bipartite graph. The use of multiple bipartite graphs is also an option, such as using a separate bipartite graph for each type of interaction on the online system. These associations provide at least two pieces of information. First, the associations identify the members who created the member-created content. Second, the associations identify interactions between the members and the member-created content. When a bipartite graph is used like in FIG. 1, the member-created content on the right side of the graph includes an edge to the member-creator of the content on the left side of the graph, and the interactions are represented by edges traversing from the members on the left side of the graph to the content on the right side of the graph.

At 230, the online system uses the associations between the members and the member-created content to calculate a creator score for a particular member. This creator score is based on the two types of interactions—the interactions by the members with content created by the particular member and also on interactions by the members with content created by other members. As noted elsewhere herein, the influence of a member who interacts with a large amount of member-created content is less than a member who interacts with a smaller amount of member-created content.

As noted at 282, the creator score is based on total interactions for all member-created content. That is, all interactions by all members with all member-created content are considered in the convergence operation of the online system. Simply put, the greater the number of total interactions with the member-created content, the greater the creator score will be for that member, although not in absolute terms, because it is relative to another member with similar quality of other interactions. As noted, these many interactions can be represented by edges from the members to the content as illustrated in FIG. 1. As further noted at 282, the creator score is based on, for each interaction by a member for the content created by the particular member, a weighting based on total interactions by the member with the content created by other members. Once again, a member's influence will be less if that member interacts with a large amount of member-created content on the online system. Additionally, at 282A, the creator score for the particular member is directly proportional to the total interactions with the content created by the particular member. Simply put, a larger number of interactions with the particular member's content will have a positive and direct effect on the creator score for that member. Similarly, the creator score for the particular member is inversely proportional to the total interactions by a member for the content created by other members.

At 240, the online system also uses the associations between the members and the member-created content to calculate a content score for the content created by a member. The content score is based on three factors. First, the content score is based on interactions by the members with the content created by the member. That is, the more members that interact with this content created by the member, the greater the content score will be for this member-created content. Second, the content score is based on the creator scores of the members who interacted with this content created by this member. That is, a member who has a high creator score will have a greater influence on the content score than a member with a low creator score. Third, the content score is based on interactions with content created by other members by the members who interacted with the content created by the member. Once again, a member who interacts with a great deal of content will have less influence that a member who interacts with a smaller amount of content. The creator score and content score are thus interrelated, and as indicated at 285, the creator score and the content score both reflect the quality of the content of the member.

At 250, the online system calculates the creator score and the content score via convergence of an iterated Markov process. In another embodiment, some other similar means of convergence could also be used to calculate the creator and content scores. Details of a Markov convergence operation are discussed above, and an example is provided below in a multi-round iteration of a calculation of a creator score and a content score.

At 260, the online system identifies the member as a creator when the creator score of the member transgresses a threshold. In an embodiment, the threshold may be determined by ranking all the creator scores for all the members on the online system, and then selecting as a threshold the creator score that represents the top ten percent of the creators on the system. Other thresholds could also be used such as the top twenty percent, the top thirty percent, the top forty percent, the top fifty percent, and other percentages. In the multi-round iteration discussed below, the creator score of member P4 eventually converges to 0.43. If the threshold for identifying a member as a creator is 0.40, the online system would then identify member P4 as a creator. The threshold can be set and re-set after as the system goes through multiple independent convergences over time.

At 287, the online system calculates creator scores for the members and content scores for the member-created content by executing operations 210-270, and more particularly, iteratively repeating operations 210-270 until the creator scores for the members converge, and until the content scores for the content in the system converge At 270, the online system generates to the members a follow recommendation for a member based on the creator score for that member. That is, it is likely that members will want to follow another member who has a high creator score (because that member has posted engaging content, as determined by the convergence process of the online system). As further indicated at 270A, the online system generates to the members a content recommendation for the content created by a member based on the content score. That is, once again, it is likely that members will find content with higher content scores more engaging than content with lower content scores (as determined by the convergence process of the online system). Basing recommendations and other features and operations of the online system on creator scores and/or content scores improves the robustness of the online system, since more engaging content will encourage more members to post such engaging content and further encourage more members to spend more time on the system by engaging with such content. In making a follow recommendation to members of the online system, the system can consider only recommending members to follow that have a creator score that is in a particular top percentage. Alternatively, the system can simply consider the creator score as one of many factors in making a follow recommendation, in connection with other factors such as the similarities of the profiles of the members and the recommended member to be followed.

The considerations of member interaction with member-created content and member interactions with other member-created content have effects on, and can be used to implement features on, the online system. For example, as indicated at 283, the interactions with the content created by a member are given more weight when the interactions with the content created by the member are from other members who have been identified as creators on the online system. This is just another effect of a creator having more influence on the online system. And as discussed above, the online system can provide a follow recommendation to members based on creator scores and content scores. Additionally, at 284, the online system can provide access to one or more features on the online system based on the creator score, and as indicated at 284A, the system can provide access to one or more features based on the content score. The creator and content scores can also be used to affect search operations on the online system. For as indicated at 286, the online system can return people search results as a function of creator scores, and at 286A, the system can return results for articles and other content based on content scores. In implementing this feature, the system may either return a member with a high creator score more often, and/or rank the creator higher in a list of returned search results. The system may also choose not to return results of members located in the search whose creator score falls below a threshold (for example, below the $90^{th}$ percentile), thereby saving on processor cycles, storage space, and user interface real estate.

The calculation of creator scores and content scores is further illustrated in the following example. Referring to FIG. 1, Member P1 has created content A3 (as indicated by the edge from A3 to P1), Member P2 has created content A1, and Member P4 has created content A2. Members P1, P2, P3, and P4 each start with an influence magnitude of 100. In a first round, since P1 has commented on or liked both A1 and A2 (as indicated by the two edges traversing from P1 to A1 and A2), P1's influential magnitude of 100 is split between A1 and A2, that is, a magnitude of 50 each for A1 and A2. Similarly, P2 has commented on both A2 and A3, so A2 receives a magnitude of 50 and A3 also receives a magnitude of 50. P3 has commented only on A3, so all of P3's influential magnitude of 100 goes to A3. P4 has not commented on any content, so P4's influential magnitude of 100 is distributed evenly among A1, A2, and A3, that is, 33.33 each to A1, A2, A3. Consequently, after this first round, the state of the system is as follows:

| Round 1 | |
|---|---|
| P1 100 | A1 50 + 33.33 = 83.33 |
| P2 100 | A2 50 + 50 + 33.33 = 133.33 |
| P3 100 | A3 50 + 100 + 33.33 = 183.33 |
| P4 100 | |

In a second round, the magnitudes assigned to content A1, A2, and A3 in the first round are redistributed to the respective authors of that content. That is, P1, the creator of A3 receives an influence of 183.33. P2, the creator of A1, receives an influence of 83.33. P4, the creator of A2, receives an influence of 133.33. P3, who is not a creator, receives an influence of 0. Then, in this second round, the influences associated with P1, P2, P3, and P4 are redistributed in the same fashion as in the first round. That is, P1's 183.33 is split between A1 and A2, such that A1 and A2 each receive a magnitude of 91.67. P2's 83.33 gets split between A2 and A3, such that that A2 and A3 each receive a magnitude of 41.67. P4's 133.33 is once again distributed evenly among A1, A2, and A3, such that A1, A2, and A3 each receive a magnitude of 44.44. P3, who has an influence of 0, has no influence to distribute. Consequently, after the second round, the state of the system is as follows:

| Round 2 | |
|---|---|
| P1 183.33 | A1 91.67 + 44.44 = 136.11 |
| P2 83.33 | A2 91.67 + 41.67 + 44.44 = 177.78 |
| P3 0 | A3 41.67 + 44.44 = 86.11 |
| P4 133.33 | |

In a third round, the influences assigned to content A1, A2, and A3 in the second round are redistributed to the respective authors of that content. That is, P1, the creator of A3 receives an influence magnitude of 86.11. P2, the creator of A1, receives and influence magnitude of 136.11. P4, the creator of A2, receives an influence magnitude of 177.78. P3, who is not a creator, receives an influence magnitude of 0. Then, in this third round, the influences of P1, P2, P3, and P4 are redistributed in the same fashion as in the first and second rounds. That is, P1's 86.11 is split between A1 and A2, such that A1 and A2 each receive an influence of 43.10. P2's 136.11 gets split between A2 and A3, such that that A2 and A3 each receive an influence of 68.10. P4's 177.78 is once again distributed evenly among A1, A2, and A3, such that A1, A2, and A3 each receive an influence of 59.26. P3, who has an influence of 0, has no influence to distribute. Consequently, after the third round, the state of the system is as follows:

| Round 3 | |
|---|---|
| P1 86.11 | A1 43.10 + 59.26 = 102.36 |
| P2 136.11 | A2 43.10 + 68.10 + 59.26 = 170.46 |
| P3 0 | A3 68.10 + 59.26 = 127.36 |
| P4 177.78 | |

In a fourth round, the influences assigned to content A1, A2, and A3 in the third round are redistributed to the respective authors of that content. That is, P1, the creator of A3 receives an influence magnitude of 127.36. P2, the creator of A1, receives an influence magnitude of 102.36. P4, the creator of A2, receives an influence magnitude of 170.46. P3, who is not a creator, receives an influence magnitude of 0. Then, in this fourth round, the influences associated with P1, P2, P3, and P4 are redistributed in the same fashion as in the first, second, and third rounds. That is, P1's 127.36 is split between A1 and A2, such that A1 and A2 each receive an influence magnitude of 63.68. P2's 102.36 gets split between A2 and A3, such that that A2 and A3 each receive an influence magnitude of 51.18. P4's 170.46 is once again distributed evenly among A1, A2, and A3, such that A1, A2, and A3 each receive an influence magnitude of 56.82. P3, who has an influence magnitude of 0, has no influence to distribute. Consequently, after the fourth round, the state of the system is as follows:

| Round 4 | |
|---|---|
| P1 127.36 | A1 63.68 + 56.82 = 120.50 |
| P2 102.36 | A2 63.68 + 51.18 + 56.82 = 171.68 |
| P3 0 | A3 51.18 + 56.82 = 108.00 |
| P4 170.46 | |

In a fifth round, the influences assigned to content A1, A2, and A3 in the fourth round are redistributed to the respective authors of that content. That is, P1, the creator of A3 receives an influence magnitude of 108.00. P2, the creator of A1, receives an influence magnitude of 120.50. P4, the creator of A2, receives an influence magnitude of 171.68. P3, who is not a creator, receives an influence magnitude of 0. Then, in this fifth round, the influences associated with P1, P2, P3, and P4 are redistributed in the same fashion as in the first, second, third, and fourth rounds. That is, P1's 108.00 is split between A1 and A2, such that A1 and A2 each receive an influence magnitude of 54.00. P2's 120.5 gets split between A2 and A3, such that that A2 and A3 each receive an influence magnitude of 60.25. P4's 171.68 is once again distributed evenly among A1, A2, and A3, such that A1, A2, and A3 each receive an influence magnitude of 57.23. P3, who has an influence magnitude of 0, has no influence to distribute. Consequently, after the fifth round, the state of the system is as follows:

| Round 5 | |
|---|---|
| P1 108.00 | A1 54.00 + 57.23 = 111.23 |
| P2 120.50 | A2 54.00 + 60.25 + 57.23 = 171.48 |
| P3 0 | A3 60.25 + 27.23 = 117.48 |
| P4 171.68 | |

In a sixth round, the influences assigned to content A1, A2, and A3 in the fifth round are redistributed to the respective authors of that content. That is, P1, the creator of A3 receives an influence magnitude of 117.48. P2, the creator of A1, receives an influence magnitude of 111.23. P4, the creator of A2, receives an influence magnitude of 171.48. P3, who is not a creator, receives an influence magnitude of 0. Then, in this sixth round, the influences associated with P1, P2, P3, and P4 are redistributed in the same fashion as in the first, second third, fourth, and fifth rounds. That is, P1's 117.48 is split between A1 and A2, such that A1 and A2 each receive an influence magnitude of 58.74. P2's 111.23 gets split between A2 and A3, such that that A2 and A3 each receive an influence magnitude of 55.62. P4's 171.48 is once again distributed evenly among A1, A2, and A3, such that A1, A2, and A3 each receive an influence magnitude of 57.16. P3, who has an influence magnitude of 0, has no influence to distribute. Consequently, after the sixth round, the state of the system is as follows:

| Round 6 | |
|---|---|
| P1 117.48 | A1 58.74 + 57.16 = 115.90 |
| P2 111.23 | A2 58.74 + 55.62 + 57.16 = 171.52 |
| P3 0 | A3 55.62 + 57.16 = 112.78 |
| P4 171.48 | |

In a seventh round, the influences assigned to content A1, A2, and A3 in the sixth round are redistributed to the respective authors of that content. That is, P1, the creator of A3 receives an influence magnitude of 112.78. P2, the creator of A1, receives an influence magnitude of 115.90. P4, the creator of A2, receives an influence magnitude of 171.52. P3, who is not a creator, receives an influence magnitude of 0. Then, in this seventh round, the influences associated with P1, P2, P3, and P4 are redistributed in the same fashion as in the first through sixth rounds. That is, P1's 112.78 is split between A1 and A2, such that A1 and A2 each receive an influence magnitude of 56.39. P2's 115.90 gets split between A2 and A3, such that that A2 and A3 each receive an influence magnitude of 57.95. P4's 171.52 is once again distributed evenly among A1, A2, and A3, such that A1, A2, and A3 each receive an influence magnitude of 57.17. P3, who has an influence magnitude of 0, has no influence to distribute. Consequently, after the seventh round, the state of the system is as follows:

| Round 7 | |
|---|---|
| P1 112.78 | A1 56.39 + 57.17 = 113.56 |
| P2 115.90 | A2 56.39 + 57.95 + 57.17 = 171.51 |
| P3 0 | A3 57.69 + 57.19 = 115.12 |
| P4 171.52 | |

By comparing the influences between the sixth and seventh rounds, it is apparent that the influence magnitudes have converged. For example, the influence magnitude for P4 has stabilized at a magnitude of approximately 171. Consequently, after the seven rounds, the creator index can be calculated by dividing the influence magnitude associated with each member by the total influence in the system (400) (the content index can be calculated in a similar manner by dividing the magnitude associated with each content by the total content quality magnitude in the system). In this example, the creator indices are as follows:

| Round 8 |
|---|
| P1 115.12/400 = 0.29 |
| P2 113.56/400 = 0.28 |
| P3 0.0/400 = 0.0 |
| P4 171.51/400 = 0.43 |

An examination of the results indicates that Members P1 and P2 are roughly equivalent creators, even though P1's content received twice as many likes (2 versus 1) because the second like came from Member P3. Member P3 is a consumer with a score of 0, so P3's like doesn't count. Member P4 is the best creator because his or her content was liked by both P1 and P2, who are themselves creators. However, P4 is not twice as good as P1 and P2 (but rather just 1.5 times better according to his or her score). It is noted that had P3 liked A1 or A2 in addition to A3, the creator scores would not have changed even though the like scores would have gone up. In this structure, people who create good content have a say, people who just consume content don't get a say.

If a new member is added to the system, and/or an existing member posts new content, the process as disclosed above is executed again to redistribute the influences in the system and then come up with the new creator and content scores. When a new member is added to the system, that member is provided with the initial amount of influence that is associated with that system, which in the above example is an influence magnitude of 100. When an existing member posts new content, all existing members begin the redistribution process with the amount of influences associated with them after the most recent rounds of redistribution.

The feature of an online system that allows the system to identify creators of high quality content improves the functionality of the online system. Specifically, by identifying members who create high-quality content, and then recommending to other members to follow that member, the other members will get more value from the online system. When more members get more value from the system, those users will tend to use the system more, which creates a more robust system. This increased use of the system by others, may also expand into still more use by others, thereby increasing the footprint of the online system, and thereby increasing the popularity of the system. In economic terms, a member base that uses an online system more and an increase in a member base of the online system will lead to increases in advertising and other revenue for the online system. Also, the system can identify content that is not high quality, handle that content such as by removing it from the system, and thereby improve the system by saving on storage in the system.

The following points are further noteworthy about an embodiment of an online system that identifies creators of high quality content on the system. The creator score is not a content score per se, because the content quality from a creator will vary from content piece to content piece. Rather, the creator score is determined by the iterative process described above and the convergence of the creator scores for a plurality of members. In short, the more important aspect is the member as a creator, and the lesser aspect is the actual content per se. As noted, the quality of content for a particular member changes from content piece to content piece, but as a creator in the aggregate a member has a certain quality or creator score. Put another way, a content score is backward looking because a piece of content is created once and that is it. But a creator score is forward looking because that can and does change as a member posts additional content in the future.

An embodiment is particularly useful in an online system wherein feed relevance features are not available. That is, not all online systems, and not all parts of a particular online system, have a plurality of feed features. Therefore, an embodiment can improve the operation of an online system that does not have such a plurality of feed features.

An embodiment also improves an online system in the following way. The system does not explicitly know the industry, location, or social network of a member (that is, without further processing such as examining a member's profile). However, the system explicitly knows the information that a member created on the feed and the information that the member interacted with on the feed. Therefore, to implement this feature, the system does not have to use processor intensive operations such as searching the profiles of members.

Figure 3:
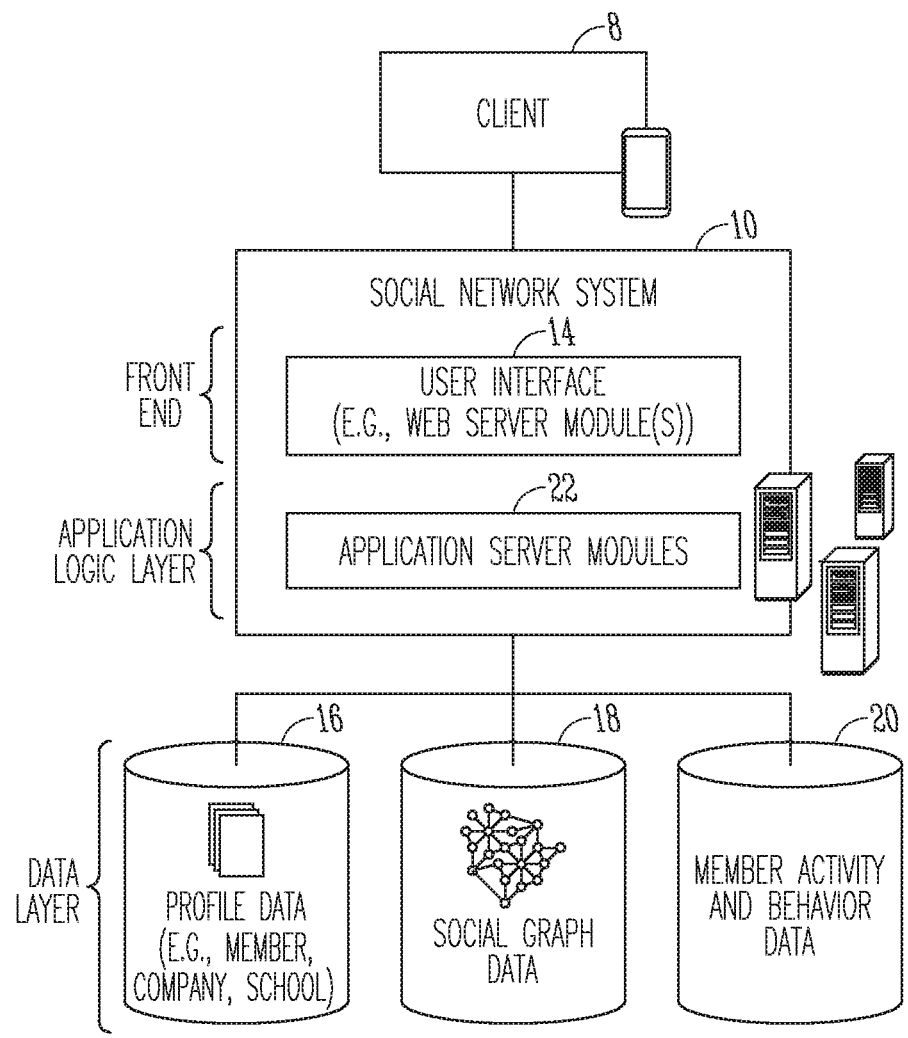
FIG. 3 is a block diagram of the functional modules or components that comprise a computer network-based online system, including application server modules consistent with some embodiments of the invention.

The foregoing systems and methods can be executed on an online system as is illustrated in FIG. 3. Specifically, FIG. 3 is a block diagram of the functional modules or components that comprise a computer-based or network-based online system 10 consistent with some embodiments of the above-described systems and methods. As shown in FIG. 3, the online system 10 is generally based on a three-tiered architecture, comprising a front-end layer, application logic layer, and data layer, and can communicate with a client device 8. As is understood by skilled artisans in the relevant computer and Internet-related arts, each module or engine shown in FIG. 3 represents a set of executable software instructions and the corresponding hardware (e.g., memory and processor) for executing the instructions. To avoid obscuring the present subject matter with unnecessary details, various functional modules and engines that are not germane to conveying an understanding of the present subject matter have been omitted from FIG. 3. However, a skilled artisan will readily recognize that various additional functional modules and engines may be used with an online system, such as that illustrated in FIG. 3, to facilitate additional functionality that is not specifically described herein. Furthermore, the various functional modules and engines depicted in FIG. 3 may reside on a single server computer, or may be distributed across several server computers in various arrangements. Moreover, although depicted in FIG. 3 as a three-tiered architecture, the present subject matter is by no means limited to such architecture.

As shown in FIG. 3, the front end comprises a user interface module (e.g., a web server) 14, which receives requests from various client-computing devices, and communicates appropriate responses to the requesting client devices. For example, the user interface module(s) 14 may receive requests in the form of Hypertext Transport Protocol (HTTP) requests, or other web-based, application programming interface (API) requests. The client devices may be executing conventional web browser applications, or applications that have been developed for a specific platform to include any of a wide variety of mobile devices and operating systems.

As shown in FIG. 3, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the online system, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's profile, for example, in the database with reference number 16. With some embodiments, a member's profile data will include not only the explicitly provided data, but also any number of derived or computed member profile attributes and/or characteristics.

Once registered, a member may invite other members, or be invited by other members, to connect via the online system. A "connection" may require a bi-lateral agreement by the members, such that both members acknowledge the establishment of the connection. The degree of connectivity refers to the amount or number of connections that exist for a particular person and/or the amount or number of connections among a group of persons. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 3, consistent with some embodiments, the system may include additional databases for storing information relating to a wide variety of entities, such as information concerning various online or offline groups, job listings or postings, photographs, audio or video files, and so forth.

With some embodiments, the online system may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generate various user interfaces (e.g., web pages) with data retrieved from various data sources in the data layer. With some embodiments, individual application server modules 22 are used to implement the functionality associated with various applications, services and features of the online system. For instance, a messaging application, such as an email application, an instant messaging application, or some hybrid or variation of the two, may be implemented with one or more application server modules 22. Of course, other applications or services may be separately embodied in their own application server modules 22.

The online system may provide a broad range of applications and services that allow members the opportunity to share and receive information, often customized to the interests of the member. For example, with some embodiments, the online system may include a photo sharing application that allows members to upload and share photos with other members. As such, at least with some embodiments, a photograph may be a property or entity included within a social graph. With some embodiments, members of an online system may be able to self-organize into groups, or interest groups, organized around a subject matter or topic of interest. Accordingly, the data for a group may be stored in a database. When a member joins a group, his or her membership in the group will be reflected in the social graph data stored in the database with reference number 18. With some embodiments, members may subscribe to or join groups affiliated with one or more companies. For instance, with some embodiments, members of the online system may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the database with reference number 18.

Figure 4:
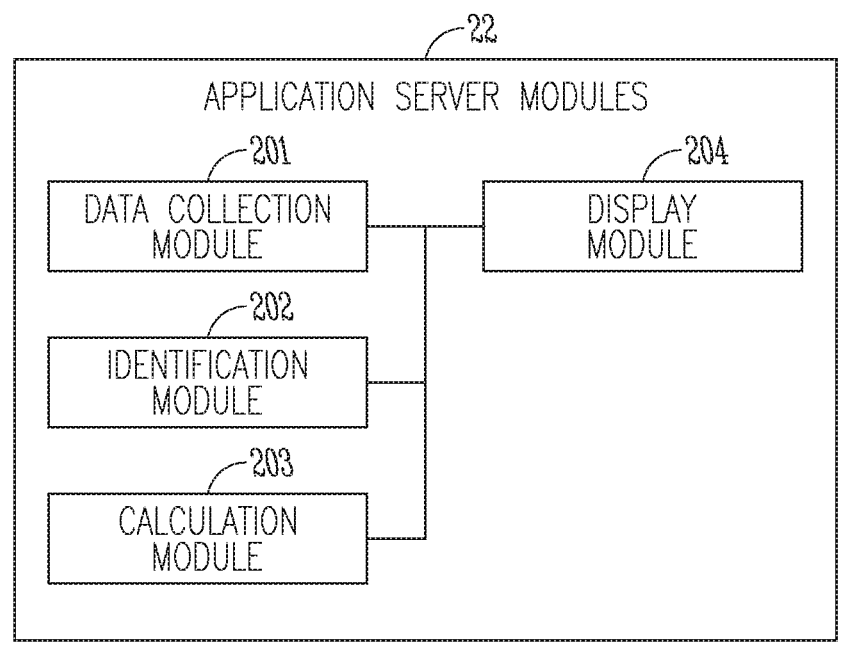
FIG. 4 is a block diagram depicting some example application server modules of FIG. 3.

FIG. 4 is a block diagram of several example modules that can make up the application server modules 22 of FIG. 3. A data collection module 201 collects data relating to members in the online system 10. The data collection module 201 can collect member-created content from members of the online system. An identification module 202 identifies likes, comments, clicks, and other member actions relating to the member-created content. A calculation module 203 calculates creator scores and content scores as disclosed above. A display module 204 presents information to a member of the online system such as member-created content and a follow recommendation.

Figure 5:
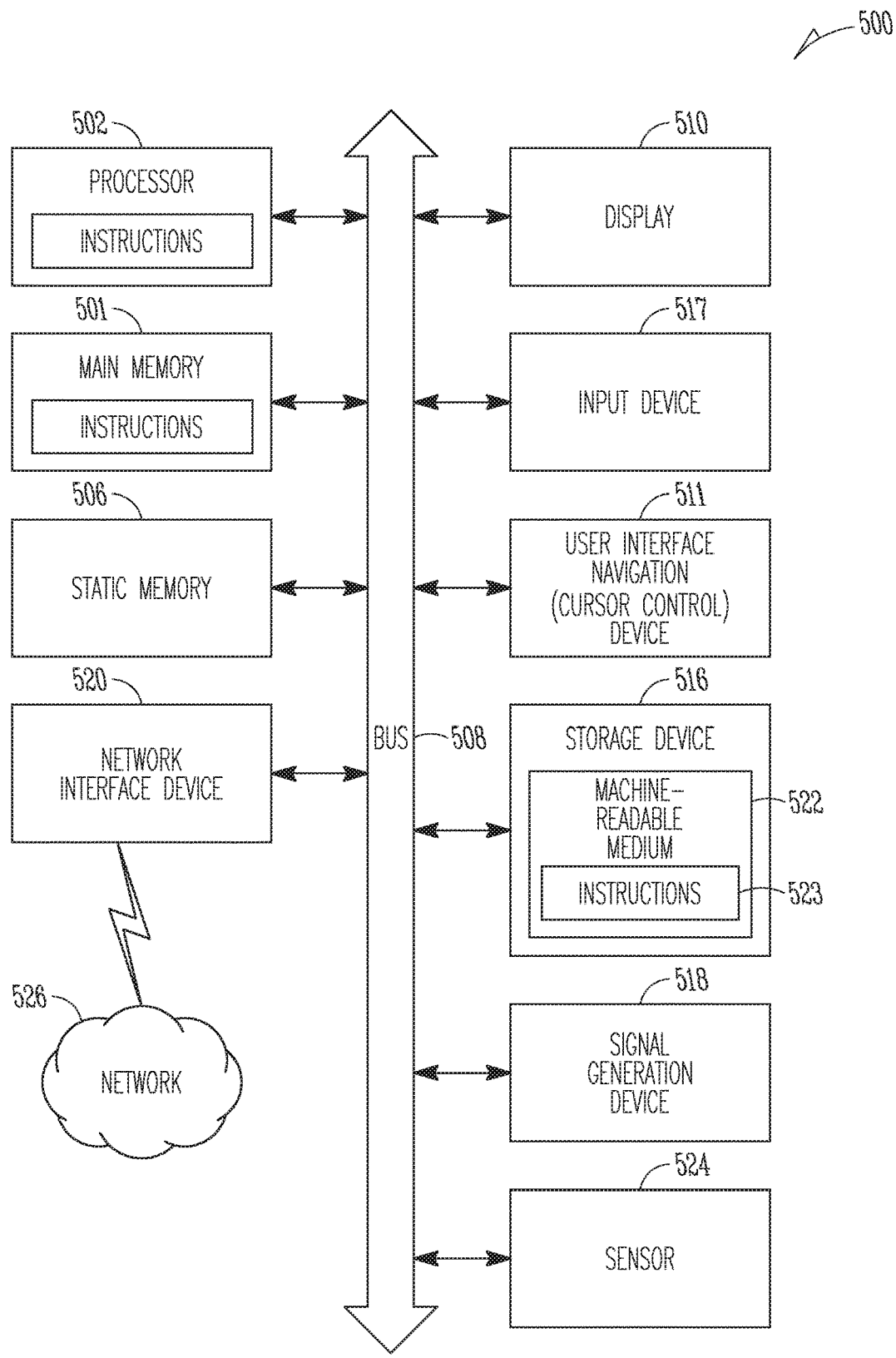
FIG. 5 is a block diagram of a machine in the form of a computing device within which a set of instructions, for causing the machine to perform any one or more of the methodologies discussed herein, may be executed.

FIG. 5 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 501 and a static memory 506, which communicate with each other via a bus 508. The computer system 500 may further include a display unit 510, an alphanumeric input device 517 (e.g., a keyboard), and a user interface (UI) navigation device 511 (e.g., a mouse). In one embodiment, the display, input device and cursor control device are a touch screen display. The computer system 500 may additionally include a storage device 516 (e.g., drive unit), a signal generation device 518 (e.g., a speaker), a network interface device 520, and one or more sensors 521, such as a global positioning system sensor, compass, accelerometer, or other sensor.

The drive unit 516 includes a machine-readable medium 522 on which is stored one or more sets of instructions and data structures (e.g., software 523) embodying or utilized by any one or more of the methodologies or functions described herein. The software 523 may also reside, completely or at least partially, within the main memory 501 and/or within the processor 502 during execution thereof by the computer system 500, the main memory 501 and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 523 may further be transmitted or received over a communications network 526 using a transmission medium via the network interface device 520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A process comprising:
   (a) receiving member-created content on an online system from members of the online system;
   (b) establishing associations between the members and the member-created content, thereby identifying the members who created the member-created content and interactions between the members and the member-created content;
   (c) using the associations between the members and the member-created content to calculate a creator score for a first member based on interactions by the members with content created by the first member and interactions by the members with content created by other members;
   (d) using the associations between the members and the member-created content to calculate a content score for the content created by the first member based on interactions by the members with the content created by the first member, creator scores of the members who interacted with the content created by the first member, and interactions of the members who interacted with the content created by the first member with content created by other members;
   (e) re-calculating the creator score and the content score via convergence of an iterated process;
   (f) identifying the first member as a creator when the creator score of the first member transgresses a threshold; and
   (g) generating to the members a follow recommendation on a graphical user interface for the first member based on the creator score for the first member.

2. The process of claim 1, comprising generating to the members a content recommendation for the content created by the first member based on the content score.

3. The process of claim 1, wherein the associations between the members and the member-created content comprise a bipartite graph.

4. The process of claim 1, wherein the creator score is based on total interactions for all member-created content; and wherein the creator score is based on, for each interaction by a particular member for the content created by the first member, a weighting based on total interactions by the particular member with the content created by other members.

5. The process of claim 4, wherein the creator score for the first member is directly proportional to the total interactions with the content created by the first member; and wherein the creator score for the first member is inversely proportional to the total interactions by the particular member for the content created by other members.

6. The process of claim 1, wherein the interactions with the content created by the first member are given more weight when the interactions with the content created by the first member are from other members who have been identified as creators on the online system.

7. The process of claim 1, comprising providing access to one or more features on the online system to the first member based on the creator score of the first member.

8. The process of claim 1, comprising providing access to one or more features on the online system to the first member based on the content score of the content created by the first member.

9. The process of claim 1, wherein the creator score and the content score reflect the quality of the content created by the first member.

10. The process of claim 1, comprising receiving a search query on the online system; and
    returning search results as a function of the creator score.

11. The process of claim 1, comprising receiving a search query on the online system; and
    returning search results as a function of the content score.

12. The process of claim 1, comprising creating creator scores for the members and content scores for the member-created content by executing steps (a) through (e); and iteratively repeating steps (a)-(e) until the creator score for the first member and the creator scores for the members converge, and until the content score for the content created by the first member and the content scores for the member-created content converge.

13. A memory device, the memory device communicatively coupled to a processor and comprising instructions which, when performed on the processor, cause the processor to:
    (a) receive member-created content on an online system from members of the online system;
    (b) establish associations between the members and the member-created content, thereby identifying the members who created the member-created content and interactions between the members and the member-created content;

(c) use the associations between the members and the member-created content to calculate a creator score for a first member based on interactions by the members with content created by the first member and interactions by the members with content created by other members;

(d) use the associations between the members and the member-created content to calculate a content score for the content created by the first member based on interactions by the members with the content created by the first member, creator scores of the members who interacted with the content created by the first member, and interactions of the members who interacted with the content created by the first member with content created by other members;

(e) re-calculate the creator score and the content score via convergence of an iterated process;

(f) identify the first member as a creator when the creator score of the first member transgresses a threshold; and (g) generate to the members a follow recommendation on a graphical user interface for the first member based on the creator score for the first member.

14. The memory device of claim 13, comprising instructions to cause the processor to generate to the members a content recommendation for the content created by the first member based on the content score.

15. The memory device of claim 13, comprising instructions to cause the processor to provide access to one or more features on the online system to the first member based on the creator score of the first member; and to provide access to one or more features on the online system to the first member based on the content score of the content created by the first member.

16. The memory device of claim 13, comprising instructions to cause the processor to receive a search query on the online system and return search results as a function of the creator score; and comprising instructions to cause the processor to receive a search query on the online system; and returning search results as a function of the content score.

17. The memory device of claim 13, comprising instructions to cause the processor to create creator scores for the members and content scores for the member-created content by executing steps (a) through (e); and iteratively repeat steps (a)-(e) until the creator score for the first member and the creator scores for the members converge, and until the content score for the content created by the first member and the content scores for the member-created content converge.

18. A system comprising:
a computer processor; and
a memory coupled to the computer processor;
wherein the computer processor is configured to:

(a) receive member-created content on an online system from members of the online system;

(b) establish associations between the members and the member-created content, thereby identifying the members who created the member-created content and interactions between the members and the member-created content;

(c) use the associations between the members and the member-created content to calculate a creator score for a first member based on interactions by the members with content created by the first member and interactions by the members with content created by other members;

(d) use the associations between the members and the member-created content to calculate a content score for the content created by the first member based on interactions by the members with the content created by the first member, creator scores of the members who interacted with the content created by the first member, and interactions of the members who interacted with the content created by the first member with content created by other members;

(e) re-calculate the creator score and the content score via convergence of an iterated process;

(f) identify the first member as a creator when the creator score of the first member transgresses a threshold; and (g) generate to the members a follow recommendation on a graphical user interface for the first member based on the creator score for the first member.

19. The system of claim 18, wherein the system is configured to generate to the members a content recommendation for the content created by the first member based on the content score.

20. The system of claim 18, wherein the system is configured to create creator scores for the members and content scores for the member-created content by executing steps (a) through (e); and iteratively repeat steps (a)-(e) until the creator score for the first member and the creator scores for the members converge, and until the content score for the content created by the first member and the content scores for the member-created content converge.

* * * * *